Nov. 14, 1961   W. A. BROOKSBANK, JR., ET AL   3,009,062
ABSORPTION ANALYZER
Filed Dec. 5, 1956   3 Sheets-Sheet 1

INVENTORS
Harry H. Hendon, Jr.
BY William A. Brooksbank, Jr.
George W. Leddicotte
James E. Strain
ATTORNEY Nov. 14, 1961   W. A. BROOKSBANK, JR., ET AL   3,009,062
ABSORPTION ANALYZER
Filed Dec. 5, 1956   3 Sheets-Sheet 2

*INVENTORS*
Harry H. Hendon, Jr.
BY William A. Brooksbank, Jr.
George W. Leddicotte
James E. Strain
ATTORNEY

United States Patent Office 3,009,062
Patented Nov. 14, 1961

3,009,062
ABSORPTION ANALYZER
William A. Brooksbank, Jr., Oak Ridge, and George W. Leddicotte, Knoxville, Tenn., James E. Strain, Las Vegas, Nev., and Harry H. Hendon, Jr., San Jose, Calif., assignors to the United States of America as represented by the United States Atomic Energy Commission
Filed Dec. 5, 1956, Ser. No. 626,555
5 Claims. (Cl. 250—83.1)

The present invention relates to radiation analysis, and more especially to novel means for conducting analyses for purposes of isotopic assay, molar concentration measurements, control of process streams in isotope separation equipment, and the like, by means of thermal neutrons.

Methods heretofore known for measuring the isotopic assay of solutions containing two isotopes of an element depended either upon separating the isotopes physically by means of a mass spectrometer, or, if one of the isotopes emits nuclear radiation, detecting and measuring that particular radiation to determine the concentration of the emitting isotope. Neither of the above methods is entirely satisfactory. Use of a mass spectrometer is laborious, time consuming, and expensive. Use of the radiation technique is limited to those isotopes which emit radiations of different characteristics. Neither method lends itself to automatic control of the output of isotope separation equipment. Analysis methods used to determine concentration, coating thicknesses, and the like admit of improvement and simplification.

With a knowledge of the shortcomings of the analytical techniques of the prior art, it is an object of our invention to provide a novel means for accurately measuring the isotopic assay of a solution in a manner suitable for continuous indication and process control. It is another object of our invention to provide novel means for analysing solutions to determine their isotopic assay when their chemical concentration is known. Conversely, for solutions where the isotopic ratio is known, an object of our invention is to provide novel means for determining the chemical concentration thereof. An important object of our invention is to provide means for automatically controlling the process output of isotope separation equipment to provide a continuous output of the desired isotopic ratio. Another object of our invention is to provide means for continuously computing and indicating the isotopic assay of a process solution.

These and other objects of our invention will become more apparent from the following detailed description of several preferred embodiments thereof, when read in conjunction with the appended drawings, wherein.

We have noted that the neutron absorption cross-sections of two isotopes of the same element, or of a solvent and a solute, are markedly different. Our invention utilizes this difference in analysis by subjecting a sample to a field of thermal neutrons, the number of neutrons counted being inversely proportional to the concentration in the sample of the material of relatively high neutron absorption cross-section. Where radiation analysis was previously done by passing a collimated beam through a sheet or sample from one side to a counter on the opposite side, we have found that an outstanding improvement in the sensitivity of analysis may be achieved by surrounding a counter tube with a sample to be analyzed so that the tube is exactly in the center of the sample, providing a source of fast neutrons spaced from the sample, thermalizing the neutrons by causing them to pass through a neutron moderator, and allowing the neutrons to diffuse radially through the sample to actuate the counter. Only in this way is a true neutron density measurement accomplished, greatly increased sensitivity results, and the corrections applied to beam measurements are not required.

Figure 1:
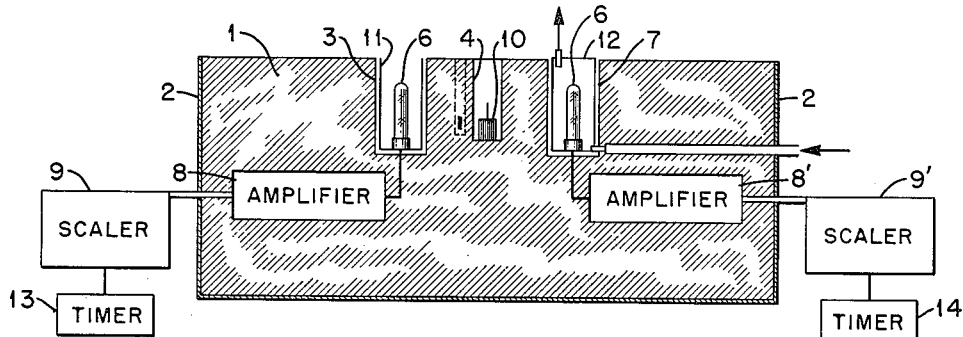
FIGURE 1 represents a simple embodiment of our invention especially adapted for laboratory use.

Referring now to FIGURE 1, our invention may be conveniently practiced in the laboratory by providing a cylindrical block of paraffin 1 in which may be drilled as desired a plurality of wells. In a simple embodiment a well 4 may be cut in the center and a source of neutrons 10 inserted therein. Wells 3, 7 may be drilled equidistant from the center well and sample cups 11, 12 inserted therein. These sample cups may be either opened or closed at the top and are preferably provided with a central well portion for receiving counter tubes 6, 6', which may be neutron detector tubes of any convenient type. If continuous analysis is desired, inlet and outlet lines may be provided to the sample cup as shown in cup 12. If batch wise analysis is to be used, an open sample cup 11 is satisfactory. To each counter is connected an amplifier 8, 8' and a scaler 9, 9' to amplify the pulses received at the detector and to count them. Clock timers 13, 14 are coupled to the scalers and are arranged to measure the time required to accumulate a selected number of counts on each of the scalers. The paraffin block 1 may be contained in a metal shielding container 2 for protective purposes.

In a suitable embodiment the neutron source comprised five curies of polonium-210 and one gram of boron encapsulated in a stainless steel cylinder, providing neutrons of substantially 2.4 mev. energy at a rate of about $2 \times 10^6$ neutrons per second. The neutron moderator was a rectangular block of paraffin wax cast into a 40 mil sheet cadmium container. The block was 20 inches long, 10 inches wide, and 10 inches deep. A well for the neutron source was bored five inches deep at a point along the center line of the block five inches from one end. The sample cells were each five inches away from the source, centerline to centerline. The cells were fabricated from both Teflon and polyethylene. The detector used was a boron-10 trifluoride proportional counter tube. Counts were amplified with a preamplifier and linear amplifier of conventional type and fed to a scaling unit also of the conventional type.

In operation, assume a sample of pure solvent is in one sample cup and a sample of an unknown solution is in the other cup. Fast neutrons originating in the neutron source are slowed down by the paraffin moderator to thermal energies. These neutrons form a sort of cloud around the sample cups and diffuse inward to the samples to actuate the detectors. The number of neutrons which actuate the detectors is a function of a concentration of the elements in solution and their neutron absorption cross sections. The pulses produced by the detectors responsive to each neutron passing therethrough are amplified and counted. The respective times required to accumulate a selected number of counts are measured by the associated timing devices.

We have found that the concentration of a particular element in solution may be determined by utilizing the following relation:

$$T_2 = T_1 + BCR$$

where B is a constant proportional to the absorption cross sections, $T_2$ is the time of count collection for the unknown solution, $T_1$ is the time of the count collection for pure solvent, R is isotopic ratio, and C is the molar concentration of the element to be determined. The isotopic ratio is commonly defined as the number of atoms of a first of two isotopes present divided by the number of atoms of the second isotope present.

Figure 6:
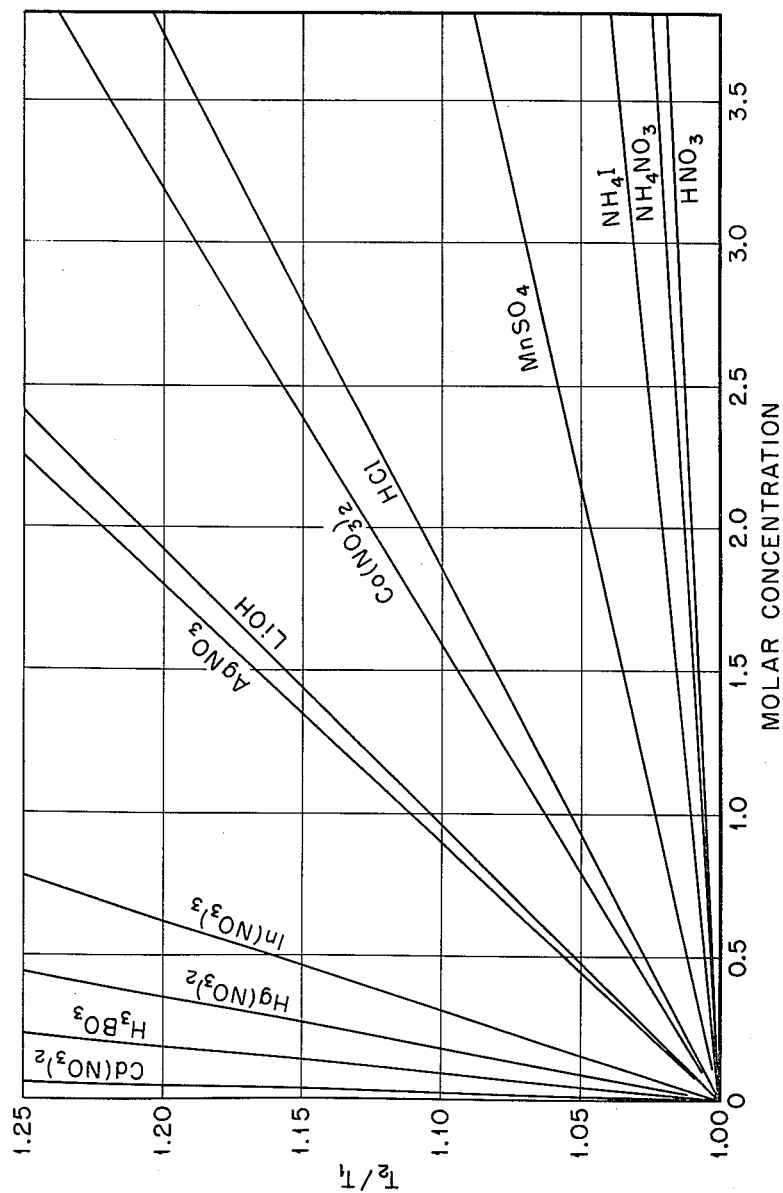
FIGURE 6 illustrates graphically calibration curves relating to different materials analyzed.

We have found that the constant B may be evaluated by means of our novel apparatus from samples of known concentration. Data so obtained may be graphically displayed as shown in FIGURE 6. From the lines plotted for each element, the slope constant B is obtained. This constant is dependent upon the neutron flux utilized and the element determined, and has no practical significance apart from the apparatus from which it was determined. Suitable values for this slope constant are shown in Table I, below, which also illustrates the lower limit of detection of our novel method for several compounds of interest. The apparent cross sections were computed relative to an assumed cross section of boron of 750 barns.

*Table I*

| Compound | Apparent "Molar" cross section, (barns) | Slope constant | Lower limit of detection (M conc.) |
|---|---|---|---|
| LiCl | 100 | 300 | 0.02 |
| HNO$_3$ | 1 | 8.1 | 0.74 |
| H$_2$SO$_4$ | 1 | 8.1 | 0.74 |
| HCl | 37 | 89.1 | 0.067 |
| LiOH | 69 | 170.3 | 0.035 |
| AgNO$_3$ | 72 | 178.4 | 0.034 |
| In(NO$_3$)$_3$ | 213 | 518.9 | 0.012 |
| Hg(NO$_3$)$_2$ | 380 | 924.3 | 0.0065 |
| H$_3$BO$_3$ | 750 | 1,808 | 0.0033 |
| Cd(NO$_3$)$_2$ | 3,250 | 7,835 | 0.00077 |

Figure 2:
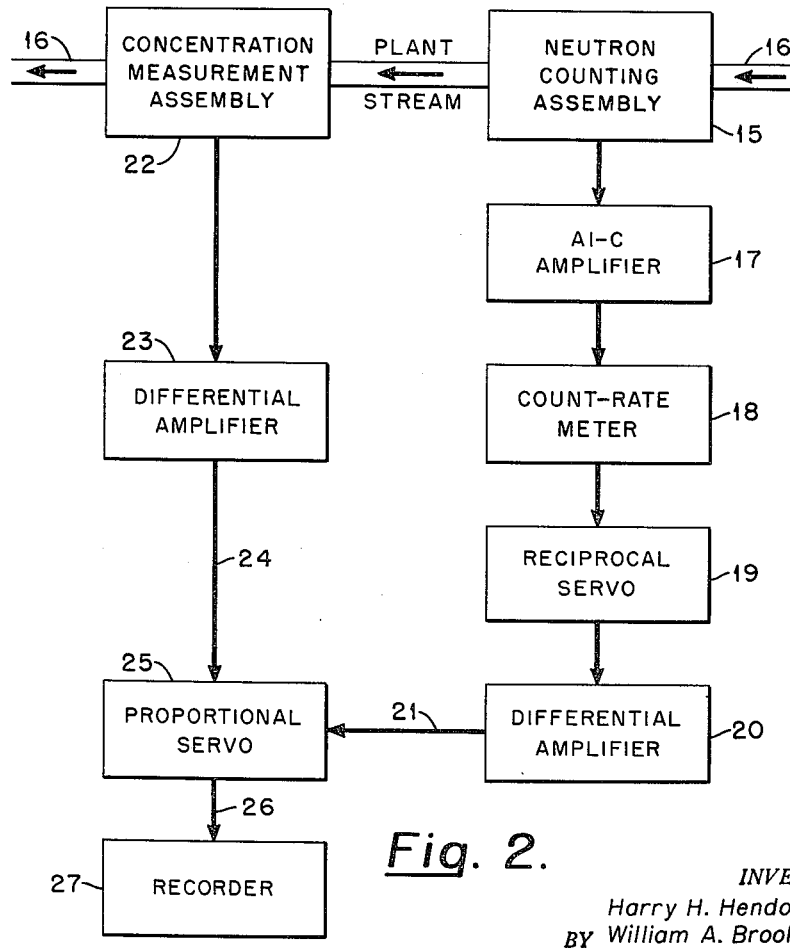
FIGURE 2 represents an embodiment of our invention especially adapted for automatic isotopic assay.

Knowing the slope constant for any element, it will be apparent that a difference in times as measured by the two timing devices is proportional to the product of the molar concentration and isotopic ratio. Therefore, when the chemical concentration is known, the isotopic concentration may be readily determined, and conversely when the isotopic ratio is known, the chemical concentrations may be determined. Since the information obtained in the embodiment of FIGURE 1 is proportional to the product of the two charateristics mentioned, when any one characteristic is to be measured or controlled it is desirable to have automatic means for continuously displaying that signal alone. Such means is provided as shown in FIGURE 2.

A stream of solution 16 to be analyzed is passed continuously through a counting assembly 15 to which is coupled an amplifier 17 and count rate meter circuit 18. The D.C. signal derived by the count rate meter circuit is inversely proportional to the concentrations and cross-sections of both isotopes of the element in solution. That signal drives a reciprocal servo system 19 to provide an output signal proportional to the reciprocal of the count rate signal. This reciprocal signal is fed to differential amplifier 20 which sutracts a constant $K_2$ from the reciprocal signal and multiplies result by another constant $K_1$. These calibration constants, derived by calibration at known concentrations and isotopic ratios, serve to correct the signal for the effect of the second isotope on the measurement in assembly 15, and are so arranged that the output 21 is directly proportional to the concentration of a single desired isotope in the solution.

By suitable means 22 a second signal is derived proportional to the concentration of the desired element in the solution. This signal may be obtained by titration of the solution to measure the concentration and setting a potentiometer to provide a voltage corresponding to the measured concentration, or it may be obtained automatically by a densitometer such as that distributed by the Taylor Instrument Company, for example. The concentration signal is applied to a second differential amplifier 23 which subtracts a constant signal $K_4$ and multiples the difference by a constant $K_3$ to provide an output signal directly proportional to the total concentration $C_1+C_2$ of the desired element in solution. The constants $K_2$, $K_4$ are subtracted by adjusting the bias or reference voltage for the differential amplifiers while the multiplication by constants $K_1$, $K_3$ is accomplished by adjusting the gain of the amplifiers. The output signal 24 is applied to a proportional servo system 25 which produces a voltage output proportional to the ratio of its inputs. Therefore the output 26 is proportional to the isotopic concentration of one isotope divided by the total concentration of both isotopes or $$\frac{C_1}{C_1+C_2}$$

The isotopic assay may be defined as the ratio of a first isotope to the concentration of both isotopes, as in the above equation. The magnitudes of the constants $K_1$–$K_4$ are derived from calibration with known concentrations of the solution, and depend upon the neutron absorption cross-sections of the isotopes being determined. The actual values of the constants $K_2$, $K_4$ depend upon the concentration $C_2$, while the magnitudes of the constants $K_1$, $K_3$ depend upon the neutron absorption cross-section of the isotope whose concentration is indicated by $C_1$. The ratio may be indicated on a conventional recorder 27.

Figure 3:
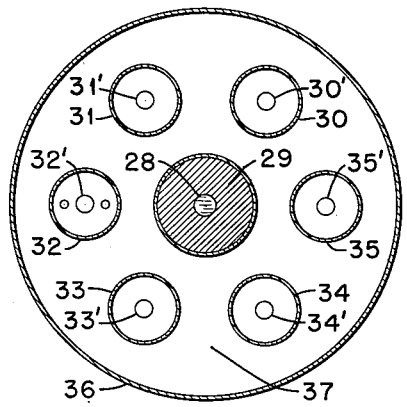
FIGURE 3 represents a top view of a suitable arrangement of a neutron source, moderator, sample cups, and counters for the system of FIGURE 2.

Referring now to FIGURE 3, the neutron counting assembly 15 shown in FIGURE 2 may take the form of a steel tank in which are disposed neutron source 28 inside a moderator 27. Symmetrically disposed about the moderator are six sample cups 30–35. Each cup is provided with a counter well in which a neutron detector 30'–35' is disposed.

Figure 4:
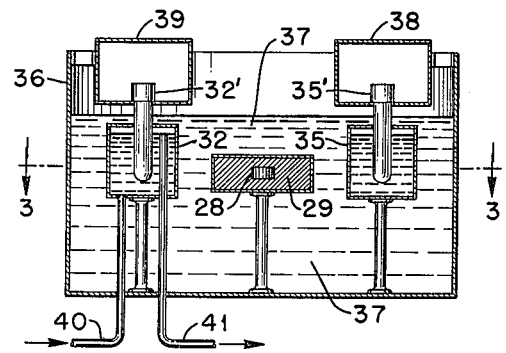
FIGURE 4 represents in elevation the elements of FIGURE 3.

In the cross sectional elevation shown in FIGURE 4, the cylindrical tank 36, filled with water moderator 37, contains neutron source 28. Two of the sample cups are illustrated. Cup 35 may be provided to hold a sample and to receive counter 35' which extends into the counter well from a mounting box 38 atop the tank 36. The box 38 may contain a preamplifier associated with the neutron detector. A similar box 39 holds counter 32' which extends downwardly into a sample cup 32. This cup may be provided for continuous flow by means of inlet line 40 and outlet line 41.

One or more cups for the standard solution may be provided as a calibration means for checking at any point during the operation. The plurality of cups otherwise provided each receive lines from different process streams, so that a plurality of process streams may be continuously monitored by one source assembly.

Figure 5:
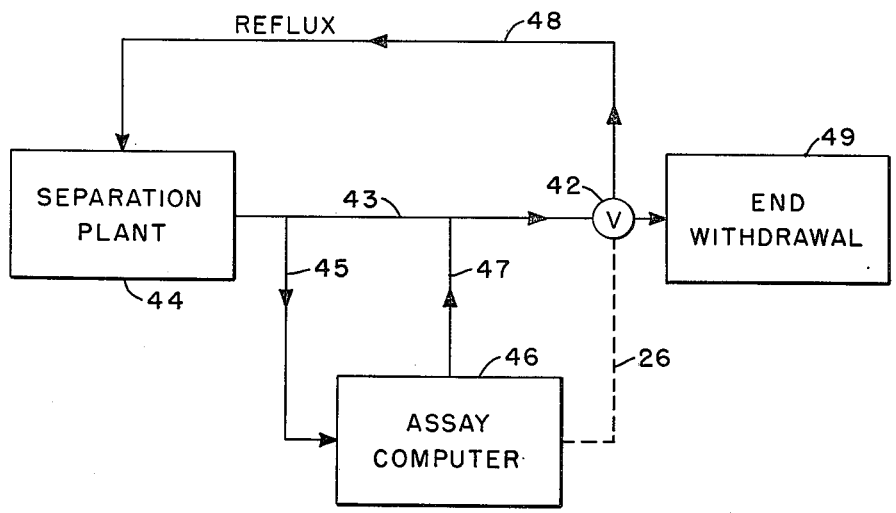
FIGURE 5 represents schematically the incorporation of our invention in automatic control of the output process stream of an isotope separation plant.

In FIGURE 5 a schematic representation shows how the assay computer shown in FIGURE 2 in block form may be incorporated in a process stream for automatic control purposes. The output signal 26 may be electrically coupled to an electrically operated valve 42 disposed in the process stream 43 from the output of an isotope separation stage 44. The stream is sampled by a line 45 which leads material to the assay computer 46. The material is returned to the stream on line 47. A reflux line 48 connects the valve with a suitable return point in the separation stage for receiving material which is too low in the desired isotopic ratio. For example, the output of the separation stage is fed to the assay computer and its isotopic ratio is determined. The automatic valve 42 is normally open so that the product flows to the withdrawal means 49. If, however, the isotopic ratio falls below that desired, as determined by the bias setting on the valve 42, the signal 26 will cause the valve to close, shunting the material in process stream 43 back through reflux line 48 to the separation stage where it undergoes further refinement. At such time as the assay computer measurements indicate the isotopic ratio has risen to the desired level, valve 42 will again open, allowing withdrawal of the properly separated products.

It will be apparent that the sensitivity of our novel method will increase with an increase in the size of the sample cells, so that the lower limits shown in Table I are valid only for the 35 mm. I.D. cell with which the data were taken. The counter tube sensitivity is also an important factor. A preferred tube was filled with boron trifluoride, totally enriched in the boron-10 isotope, at 2 atmospheres, operated on a plateau extending from about 1900–2900 volts. The sensitive volume of the tube is preferably small for the wax or laboratory model of FIG. 1, a preferred tube having a sensitive volume of about $\frac{1}{4}'' \times 1\frac{1}{2}''$. Our method for assay is most sensitive where one of the isotopes has a very large cross-section, as shown by the $Cd(NO_3)_2$ curve. The cross-sections of different isotopes of the same element are generally very different; for example, the cross-sections for hydrogen are: $H_1$—0.3, $H_2$—0.0005; $B_{10}$—3800, $B_{11}$—0.05; $Cl_{35}$—43, $Cl_{37}$—0.6. Other isotopes are characterized by similar differences, as may be noted from published tables. Solvents such as water, alcohol or organic solvents generally and pyridine have been investigated and found not to interfere with our neutron diffusion assay measurements.

Other applications of our invention in process control methods and apparatus will suggest themselves to those skilled in the art without departing from the spirit of the invention. The system may be applied to any determination of constituents having different absorption cross-sections, such as boron in steel, for example, and is not limited to isotope separations processes.

Having described the invention, what is claimed as novel is:

1. Means for analyzing solutions containing two isotopes of a first element comprising a vessel for containing said solution, a neutron source disposed in spaced relationship therewith, a neutron detector disposed concentrically within said vessel, circuit means for deriving from said detector a first variable signal proportional to the reciprocal of the counting rate of said detector, first and second sources of a constant signal, a first differential amplifier having one input connected to receive said first variable signal and another input connected to receive said first constant signal, for generating an output signal proportional to the difference in said input signals, means for deriving a second variable signal proportional to the molar concentration of said first element in said solution, a second differential amplifier provided with one input coupled to said last named means and a second input coupled to receive said second constant signal for generating an output signal proportional to the difference in said input signals, means coupled to said amplifiers for deriving the ratio of said output signals, and means to indicate said derived ratio as a measure of the isotopic assay of said first material.

2. Means for controlling the output process stream of an isotope separation system containing two isotopes of a selected element comprising a neutron source disposed in spaced relationship to said stream, a neutron detector disposed concentrically within said stream, means connected to said detector for deriving a variable signal proportional to the reciprocal of the counting rate thereof, a first source of a constant signal, a first differential amplifier provided with a first input coupled to receive said variable signal and a second input coupled to receive said constant signal for generating an output signal proportional to the difference between said input signals, means for deriving a signal proportional to the total molar concentration of said element in solution, a second source of constant signal, a second differential amplifier provided with a first input connected to said concentration signal deriving means and a second input coupled to said second signal source for generating an output signal proportional to the difference between said input signals, means for deriving a control signal proportional to the ratio of the output signals from said amplifiers, and means for diverting said output process stream back to said separation system responsive to a control signal below a selected control level.

3. Means for controlling the output process stream of an isotope separation system provided with an input and an output, a reflux line connecting said output with said input, valve means in said reflux line for opening or closing the same responsive to a control signal, and means for deriving said control signal comprising a neutron source, a neutron moderator surrounding said source, a neutron detector, a sample cup connected in said stream and disposed concentrically about said detector, means for deriving from said detector a first variable signal proportional to the reciprocal of the counting rate of said detector, a source of a first constant signal, a differential amplifier provided with a first input connected to said first variable signal source and a second input connected to said first constant signal source for generating an output signal proportional to the difference between said input signals, means for deriving a second variable signal proportional to the molar concentration of said element in solution, a source of a second constant signal, a second differential amplifier provided with a first input connected to receive said second variable signal and a second input connected to receive said second constant signal for generating an output signal proportional to the difference between said input signals, means for deriving the ratio of the output signals from said first and second amplifiers as a control signal, means to indicate the magnitude of said control signal, and means coupling said control signal to said valve to operate the same responsive to a control signal less than a selected magnitude.

4. Means for analyzing solutions containing two isotopes of a selected element wherein one but not both of the isotopic ratio and molar concentration characteristics is unknown, comprising a source of thermal neutrons, at least two sample containers disposed in spaced relation to said source for receiving a standard and an unknown sample, respective neutron detectors disposed coaxially of said containers, pulse counting means associated with each detector, respective timing means associated with each of said counting means and actuable upon receipt of a selected number of pulses, for measuring first and second times, the difference between said times being proportional to the unknown one of said solution characteristics.

5. An assay meter for solutions containing two isotopes of a selected element comprising a tank, a source of neutrons disposed within said tank, a block of moderator provided with a central recess for receiving said source to thermalize said neutrons and absorb gamma rays from said source, a sample cup provided with inlet and outlet lines and a central counter well and disposed in spaced relation to said source, a neutron detector disposed within said well to receive neutrons diffusing through the solution in said cup, means for determining the molar concentration of said element in solution, means for deriving a first signal proportional to the reciprocal of the counting rate of said detector, means for deriving a second signal proportional to said concentration, respective calibration means for correcting both of said signals, and means for deriving and indicating an output proportional to the ratio of said corrected first and second signals.

References Cited in the file of this patent

UNITED STATES PATENTS 2,567,057    Crumrine _____ Sept. 4, 1951

(Other references on following page)

UNITED STATES PATENTS

| | | |
|---|---|---|
| 2,744,199 | Juterbock et al. | May 1, 1956 |
| 2,833,929 | Barieau | May 6, 1958 |
| 2,873,377 | McKay | Feb. 10, 1959 |
| 2,883,542 | Jacobs | Apr. 21, 1959 |
| 2,892,091 | Sawle | June 23, 1959 |
| 2,898,466 | Lintz et al. | Aug. 4, 1959 |
| 2,899,555 | Fries | Aug. 11, 1959 |

OTHER REFERENCES

Berl: Physical Methods in Chemical Analysis, vol. III, published Nov. 19, 1956, by Academic Press Inc., pages 535–537.